US011404892B2

(12) United States Patent
Will et al.

(10) Patent No.: US 11,404,892 B2
(45) Date of Patent: Aug. 2, 2022

(54) PORTABLE POWER SYSTEM WITH MODULAR BATTERY PACK RECEPTACLE

(71) Applicant: Saint Spring, LLC, Orlando, FL (US)

(72) Inventors: Jeffrey Dale Will, Valparaiso, IN (US); Collin Thomas Luft, Wildwood, MO (US); Stanley Joseph Igras, Hebron, IN (US); Daniel James White, Valparaiso, IN (US); Jacob Christopher Harrison, Valparaiso, IN (US)

(*) Notice: Subject to any disclaimer, the term of this patent is extended or adjusted under 35 U.S.C. 154(b) by 88 days.

(21) Appl. No.: 16/774,171

(22) Filed: Jan. 28, 2020

(65) Prior Publication Data

US 2020/0244088 A1 Jul. 30, 2020

Related U.S. Application Data

(60) Provisional application No. 62/797,849, filed on Jan. 28, 2019.

(51) Int. Cl.
*H02J 7/00* (2006.01)
*H05B 1/02* (2006.01)
*H02J 7/02* (2016.01)

(52) U.S. Cl.
CPC ............ *H02J 7/0045* (2013.01); *H02J 7/007* (2013.01); *H02J 7/0024* (2013.01);
(Continued)

(58) Field of Classification Search
CPC .. H02J 50/12; H02J 50/90; H02J 50/80; H02J 50/70; H02J 50/50; H02J 7/025; H02J 50/60; H02J 7/0047; H02J 50/40; H02J 5/005; H02J 7/00304; H02J 7/35; H02J 1/00; H02J 1/001; H02J 13/00; H02J 13/0003; H02J 3/00; H02J 50/005; H02J 7/00; H02J 7/00034; H02J 50/402; H02J 50/10; H02J 7/0013; H02J 7/0029; H02J 7/00309; H02J 7/045; H02J 50/05; H02J 50/502; H02J 7/0042; H02J 50/20; H02J 2310/40; H02J 2310/48; H02J 7/00045; H02J 7/007182; H02J 7/04; H02J 2300/28; H02J 7/0027; H02J 7/00302; H02J 7/00714; H02J 7/34; H02J 7/00036; H02J 7/00308; H02J 7/0044; H02J 2300/22; H02J 2310/22; H02J 7/00041; H02J 7/0048; H02J 7/342; H02J 3/322; H02J 50/15; H02J 50/30; H02J 1/10; H02J 13/00004; H02J 2207/40; H02J 2300/24; H02J 2310/14; H02J 3/0075; H02J 3/14; H02J 3/32; H02J 3/38; H02J 3/381;
(Continued)

(56) References Cited

U.S. PATENT DOCUMENTS

| 2011/0025263 | A1* | 2/2011 | Gilbert | H02J 7/0026 320/108 |
|---|---|---|---|---|
| 2013/0183562 | A1* | 7/2013 | Workman | H01M 50/502 429/100 |
| 2016/0099575 | A1* | 4/2016 | Velderman | H02J 3/36 320/113 |

* cited by examiner

*Primary Examiner* — Binh C Tat
(74) *Attorney, Agent, or Firm* — Shutts & Bowen LLP

(57) ABSTRACT

Systems and methods are provided for a portable power system. A portable power system can include a housing having a plurality of receptacles adapted to receive one or more batteries. The housing can further include control circuitry that is configured to utilize the batteries in order to provide output power to one or more detachable external devices. Examples of such external devices include fry pans, sauce pans, griddles, blenders, lights, or power inverters.

11 Claims, 5 Drawing Sheets

(52) U.S. Cl.
CPC ............ *H02J 7/00047* (2020.01); *H02J 7/02* (2013.01); *H05B 1/0261* (2013.01)

(58) Field of Classification Search
CPC .... H02J 3/383; H02J 4/00; H02J 50/23; H02J 7/00047; H02J 7/0024; H02J 7/0045; H02J 7/0063; H02J 7/007; H02J 7/02; H02J 9/06
USPC .................................................. 320/116–125
See application file for complete search history.

PORTABLE POWER SYSTEM WITH MODULAR BATTERY PACK RECEPTACLE

BACKGROUND OF THE INVENTION

Field of the Invention

The present invention relates to the field of portable power systems, and more specifically, to a portable power system utilizing a modular battery pack receptacle.

Description of the Related Art

Severe weather events such as hurricanes can have a significant impact on utilities by damaging the infrastructure used to deliver power to homes and businesses. It can take days or weeks for repairs to be made and power to be restored to those affected by a storm. While generators can be used to alleviate this problem, they can be very expensive, difficult to operate, and noisy. Generators also require fuel to run, which may be in short supply during a storm's aftermath and which poses additional dangers associated with the handling and storage of fuel as well as toxic fumes produced during operation. Also, using a generator to power a cooking appliance such as a stove in order to prepare a single meal or boil some water may be impracticable. Alternatives to generators include devices that are powered with natural gas such as propane-based portable stoves. However, use of natural gas devices indoors likewise poses dangers due to fumes and presents a significant fire hazard.

Existing portable appliances that utilize batteries are likewise flawed because they are inefficient, expensive, and bulky. Portable appliances intended for consumer use are unable to provide sufficient power to perform basic functions such as cooking and boiling water on a single charge. Furthermore, these existing portable appliances are often integrated with their power source which requires users to have different types of batteries available for each appliance. Therefore, there is a need for a flexible and portable power system that can be used with multiple different appliances and/or devices. There is a further need for utilizing a modular battery pack receptacle that can accommodate standard high-capacity battery packs that are readily available for use in most homes. A modular battery pack receptacle can permit users to utilize and quickly switch-out pre-charged batteries in order to provide a sustained power source.

BRIEF SUMMARY OF THE INVENTION

Embodiments of the present invention address deficiencies of the art with respect to portable power systems and provide a novel and non-obvious power system that utilizes a modular battery pack receptacle. The present technology permits use of different types of standard high-capacity batteries with a power system having a modular battery receptacle that can be used to deliver power to a variety of different external devices.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a portable power system. The portable power system can include a modular battery receptacle that can be made of a housing with a plurality of receptacles (e.g. slots, containers, sockets, fittings) for receiving one or more batteries. The system further includes control circuitry inside of the housing that is adapted to provide output power to a detachable external device. The output power can be delivered to the detachable external device via a cord that is connected to the housing and electrically coupled to the output of the control circuitry.

Figure 1:
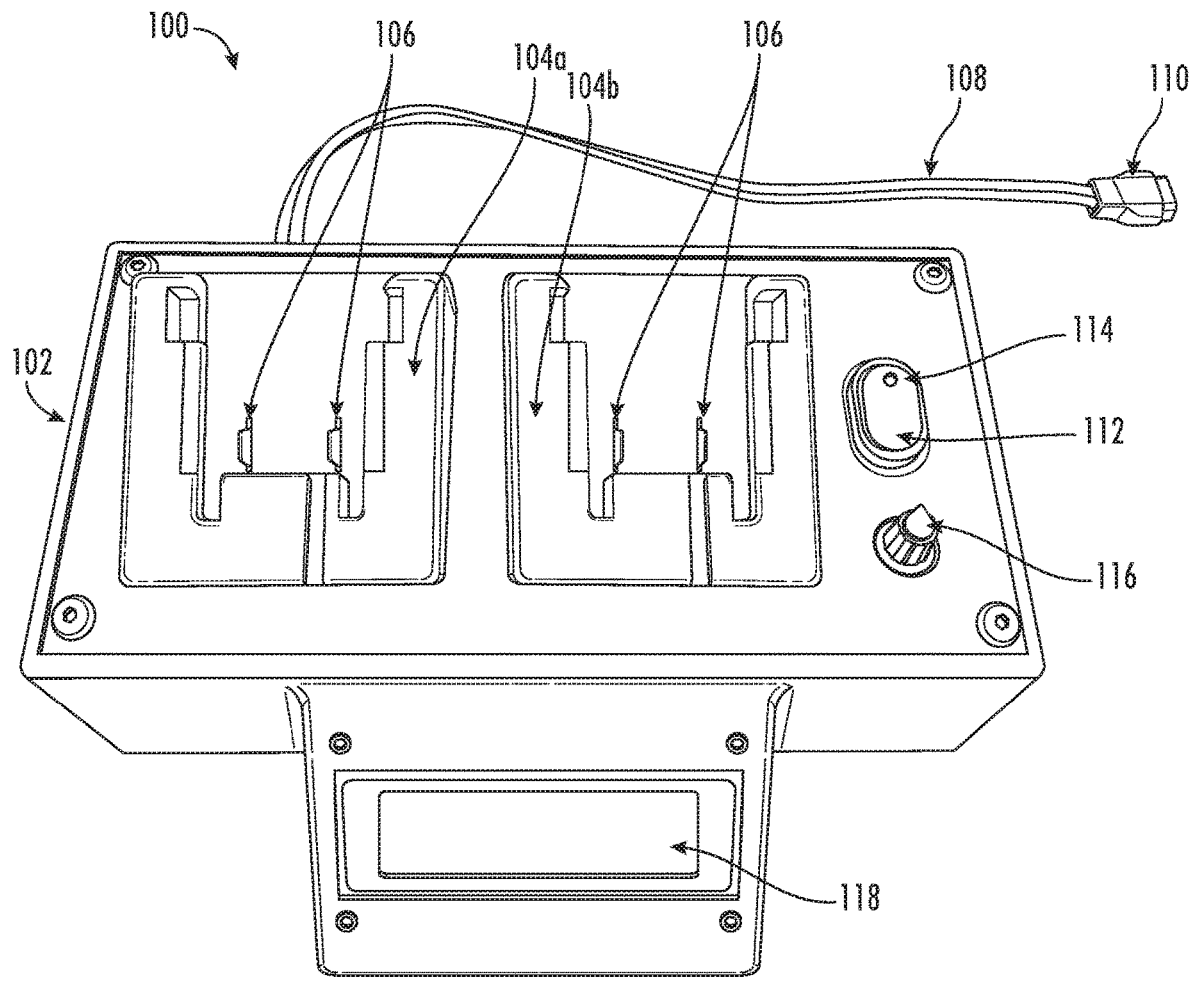
FIG. 1 is a top perspective view of a portable power system.

In further illustration, FIG. 1 is a top perspective view of a portable power system 100. The portable power system 100 can include a housing 102 that can be used to enclose electrical circuitry for controlling the portable power system, and more specifically, for utilizing energy stored in batteries to power a variety of external devices. The housing 102 can be formed from materials such as metal or plastic.

The portable power system 100 can include receptacles 104a and 104b that provide an engagement mechanism for different types of batteries. Each receptacle 104 can be connected to or attached to a surface of housing 102, or they can be formed as part of a unitary construction with one of the exterior surfaces of housing 102. As illustrated, receptacles 104 are formed as part of a top cover of housing 102. However, receptacles 104 can be likewise mounted on or formed as part of a sidewall of housing 102. Similarly, while the illustrated embodiment includes two receptacles 104a and 104b, the present technology is not limited to a specific number or type of receptacles 104.

Each receptacle 104a, 104b can include one or more electrical contacts 106. Electrical contacts 106 can be used to make an electrical connection between terminals on the batteries and the control circuitry embedded within housing 102. For example, electrical contacts 106 may correspond and connect to battery terminals for the anode, cathode, battery identification circuitry, one-wire interface, battery temperature monitoring, cell voltage monitoring, etc.

The shape of receptacles 104 and the position of electrical contacts 106 can be designed to accommodate specific types of batteries. In some embodiments, the system 100 may include interchangeable receptacles that can be attached and removed from housing 102 to accommodate different battery designs. Alternatively, the system 100 could include mechanical inserts (not illustrated) that can be used as adaptors to facilitate use of batteries that have different mechanical specifications. In another embodiment, receptacles 104 may include different sets of electrical contacts 106 that can be extended and retracted to adapt to different battery types.

The system 100 can include an electrical cord 108 that is connected to housing 102 on one end and has a connector 110 at its opposite end. The electrical cord 108 can be used to deliver power generated by the output of the circuitry embedded within housing 102 to various types of external devices. The electrical cord 108 can also be used to provide a communications interface between the circuitry within housing 102 and various external devices. In some embodiments, connector 110 can consist of a universal adapter that is used to connect system 100 to external devices such as fry pans, sauce pans, griddles, blenders, power inverters, lights, electric blankets, etc., which each have corresponding connectors that can mate with connector 110.

Alternatively, electrical cord 108 may include different types of connectors 110 for mating with different types of external devices. For example, a particular version of connector 110 may be adapted to mate with one or more cooking devices while another version of connector 110 may be adapted to mate with 120V based devices or DC motor-based devices. Although FIG. 1 is illustrated with cord 108 having connector 110 at its distal end, embodiments with one or more connectors disposed on housing 102 are also contemplated herein. For example, housing 102 may include one or more connectors configured to mate with cables associated with different external devices. In some embodiments, the circuitry within housing 102 may include a power inverter and housing 102 may include different types of standard AC receptacles, such as the 120 V AC receptacle used in the United States.

The system 100 can include various user interface elements such as a power switch 112 that is used to turn the system on and off and an LED 114 that provides a visual indication that the unit is on or off. The system can also include a knob or dial 116 that can be used to adjust the average output power by adjusting a duty cycle of the output signal. Alternative embodiments can include other user interface components to control system 100. Further details of the control circuit are discussed in connection with FIG. 3.

In some embodiments, the system 100 can also include a graphical user interface 118 such as a display that can be used to provide status or feedback to the user such as battery voltage, battery capacity, battery temperature, use time remaining, charge time remaining, duty cycle, frequency, etc. The graphical user interface 118 could also be used to provide and/or receive instructions. In some embodiments, the graphical user interface 118 may include touch-screen functionality. Other user interface elements can include dials, knobs, or switches that can be used to change settings (e.g. low, medium, high), select specific temperatures, and/or select the external device.

In some embodiments, selection of the external device may cause system 100 to utilize certain predetermined parameters. For example, selection of a sauce pan as the external device may be associated with a different output voltage than a fry pan or a griddle. In other embodiments, the system 100 may automatically detect the type of external device connected to cord 108 and load the pre-set parameters that correspond to the type of external device detected. The system 100 may permit the user to vary the pre-set parameters within a particular operating range that is safely compatible with the type of external device. The system 100 may also permit the user to store the user's preferred settings.

Figure 2:
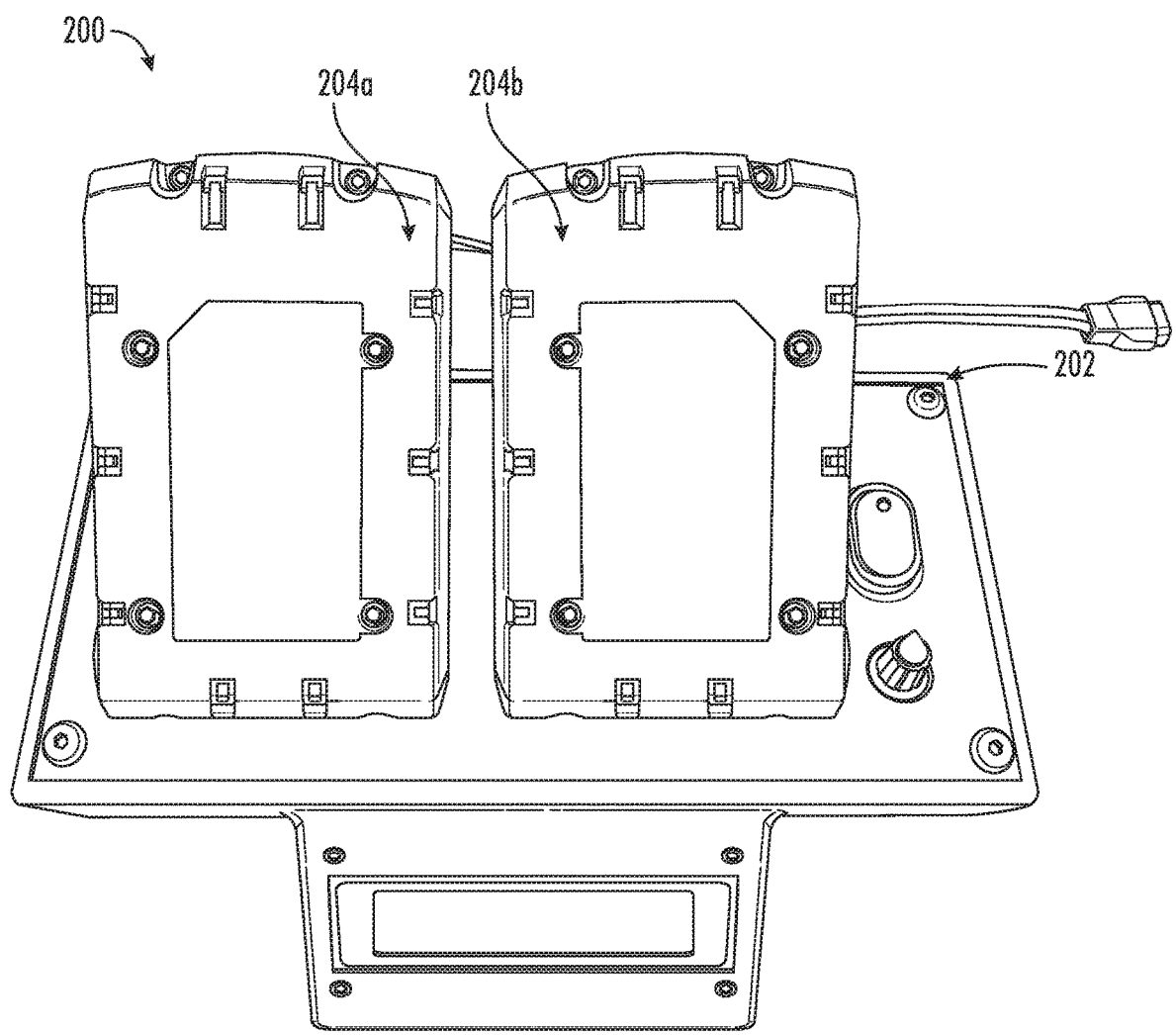
FIG. 2 is a second top perspective view of a portable power system with batteries mounted thereon.

FIG. 2 is a second top perspective view of a portable power system 200 with batteries 204*a*, 204*b* mounted thereon. Similar to the system discussed in connection with FIG. 1, system 200 includes a housing 202 that has receptacles mounted on an exterior surface of housing 202 that are adapted to accommodate different types of batteries. FIG. 2 illustrates an embodiment of the system 200 that utilizes two rechargeable battery packs 204*a* and 204*b*. Battery packs 204*a* and 204*b* can include battery packs having different voltage and capacity ratings. In some embodiments, battery packs 204*a* and 204*b* may be rated at 18 V and have 9 Ah of capacity. Alternative embodiments that utilize batteries having different voltage and/or capacity are contemplated herein.

Figure 3:
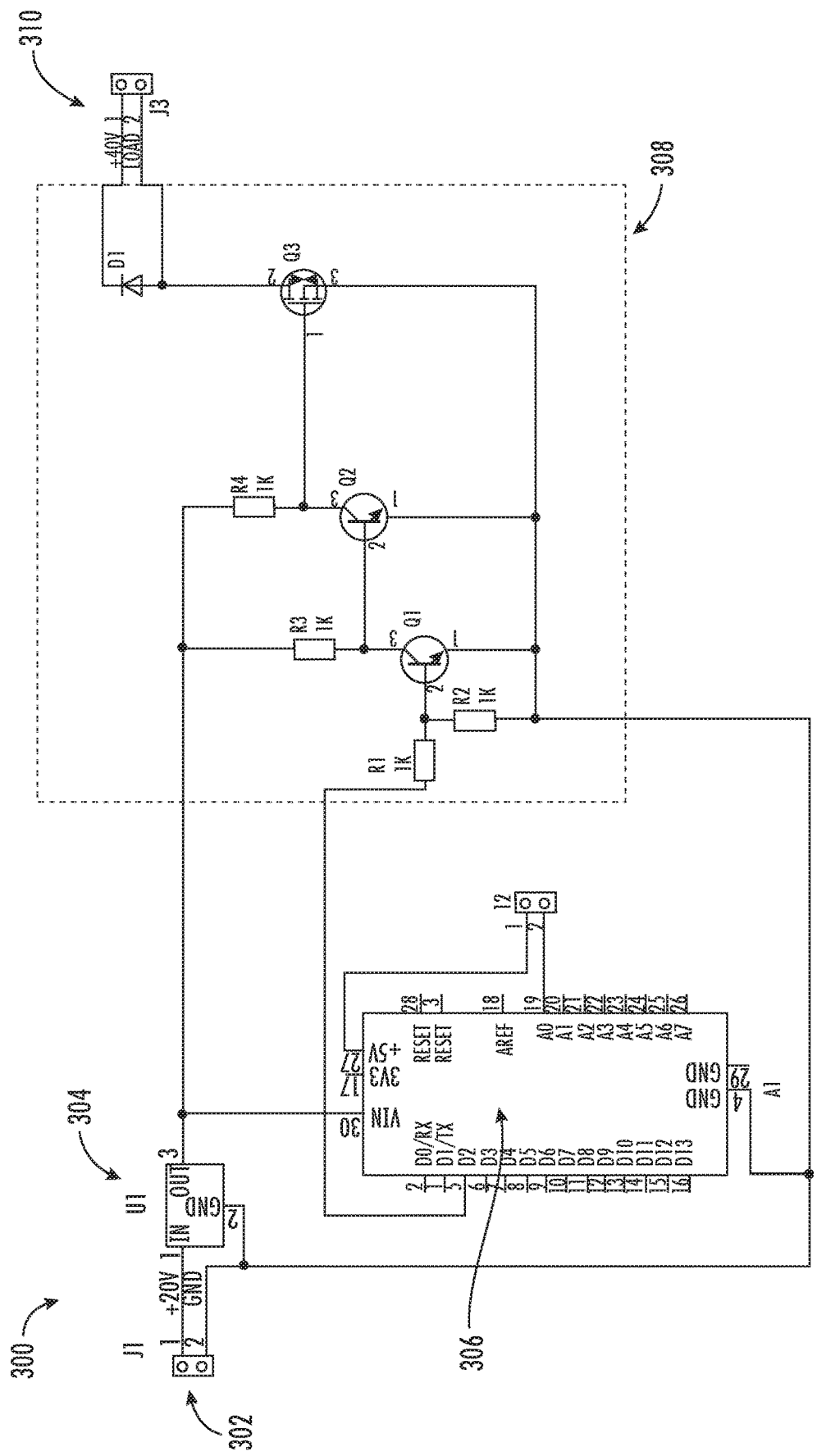
FIG. 3 is a schematic of exemplary control circuitry for use in a portable power system.

FIG. 3 is a schematic of an exemplary control circuit 300 for use in a portable power system. Control circuit 300 can include one or more inputs such as terminals 302 that are connected to the terminals on one or more batteries (not illustrated). Control circuit 300 can also include one or more voltage regulators such as regulator 304 that can be used to provide bias voltages to other components in control circuit 300.

Control circuit 300 can include different electrical components such as resistors, capacitors, inductors, diodes, and transistors. An exemplary configuration of some of these electrical components is designated as 308. Control circuit 300 can also include a microprocessor 306 that can be configured to interface with components 308 to perform a variety of tasks that are discussed further herein. Microprocessor 306 may also include embedded volatile and non-volatile memory to facilitate storage and execution of programming instructions and/or data. Alternatively, control circuit 300 may include discrete memory devices such as RAM, ROM, FLASH, EEPROM, etc. that can interface with microprocessor 306.

In operation, microprocessor 306 can be configured to detect insertion of one or more batteries. Microprocessor 306 can determine different electrical parameters associated with the batteries, such as voltage, capacity, power, maximum current, chemistry, etc. In some embodiments, microprocessor 306 may determine one or more of the battery electrical characteristics by communicating with a processor, storage device, or circuitry embedded within the battery module. Alternatively, microprocessor 306 may determine one or more of the battery electrical characteristics by performing measurements on the battery. In yet another embodiment, a user may be able to provide input to the microprocessor that is used to identify the battery and/or its electrical parameters. In some embodiments, microprocessor 306 may store parameters associated with particular batteries and retrieve the parameters upon detecting that a battery is being re-used.

Microprocessor 306 can be configured to utilize the energy stored in one or more batteries to provide power to external devices by controlling circuit components 308. The external devices are represented as load 310. For example, microprocessor 306 may cause different power levels to be delivered to load 310 by generating a pulse-width modulated output signal that can have a varying duty cycle and a varying frequency. In some embodiments, microprocessor 306 can determine the duty cycle and frequency of the output signal in accordance with pre-programmed settings that can function with various different loads 310. Microprocessor 306 can dynamically adjust the duty cycle and frequency based on parameters such as voltage, power, temperature, and load, which can change while control circuit 300 is in operation.

In some embodiments, microprocessor 306 may determine the proper output signal (e.g. duty cycle or frequency) in accordance with the load 310. For example, microprocessor 306 may identify the type of external device and utilize settings that correspond with that device. In some embodiments, microprocessor 306 can also measure the resistance/impedance of the load in order to determine the appropriate output settings. In doing so, microprocessor 306 may include a self-calibration mode to account for resistance introduced by different cables. For example, control circuit 300 may incorporate remote sense signals that permit accurate measurement of load 310 independent of the voltage drop in the cables that deliver power to the external device.

In some embodiments, microprocessor 306 may adjust the output signal according to user input. For example, a user may adjust the heat of an external fry pan by providing input to the microprocessor 306 via a dial or knob (e.g. potentiometer) or by selecting particular settings via buttons or a GUI. Alternatively, a user interface on the device may require a user to select the type of device that is connected prior to enabling the output signal in order to make sure the output signal is compatible with the device. In addition, microprocessor 306 may also provide output or feedback to the user via different user interface devices such as LEDs, displays/screens, speakers, etc.

In some embodiments, control circuit 300 may include a parallel configuration for the batteries while other embodiments may include a series configuration. Alternatively, control circuit 300 may include components that permit active switching between parallel and series configurations in order to optimize system efficiency. That is, the loads associated with some external devices may require higher voltages and lower currents which would benefit from a series configuration, while other devices may require lower voltage and higher current, which would benefit from a parallel configuration. In another embodiment, the control circuit may include components that permit the processor 306 to independently switch between each battery individually. The microprocessor 306 can intelligently select the appropriate configuration depending on the application and/or device.

Similarly, in some embodiments the battery configuration can be adjusted based on battery charge status. For example, if a user inserts a first battery that is fully charged and a second battery that is partially charged, microprocessor 306 can select a series configuration to optimize the input voltage. In some embodiments, if a user inserts two or more batteries that have different charge levels or different electrical specifications, microprocessor 306 can utilize each of the batteries independently by arranging the batteries in a parallel configuration and switching or multiplexing the input source. For example, the input source can be multiplexed and the time/duration of the selected input source can be varied to utilize the battery having the higher charge for longer periods of time and can be adjusted as the batteries are each discharged.

In some embodiments, control circuit 300 can also include electrical components for charging one or more batteries. For example, control circuit 300 may include a rectifier to convert AC electrical input to DC for charging one or more batteries. Alternatively, control circuit 300 can be adapted to receive a DC voltage from an external power supply that can be used to charge one or more batteries.

Control circuit 300 can also include safety circuitry such as a fuse or circuit breaker. In some embodiments, the control circuit may also include temperature-sensing circuits that can be used to cut back or shut off the output power if the temperature exceeds a particular threshold. The temperature sensing circuits can also be utilized to ensure safe operation during charging cycles.

Figure 4:
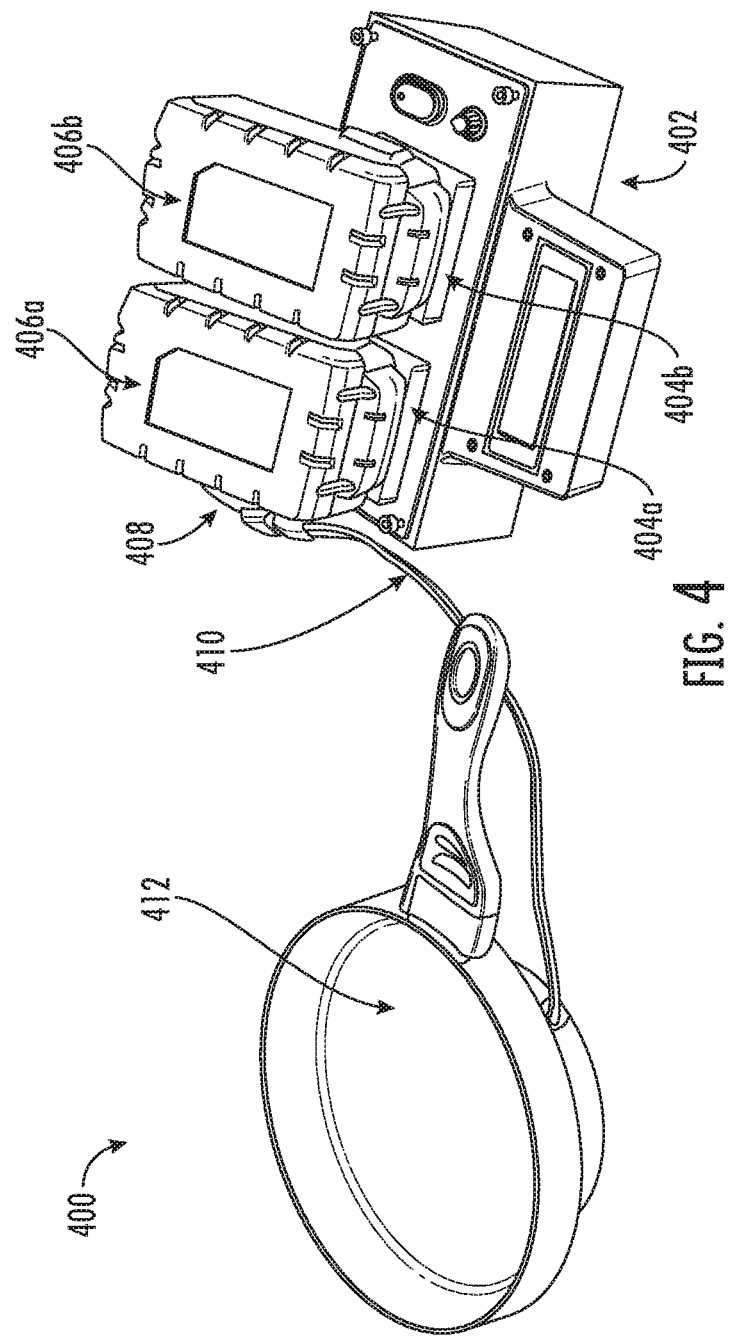
FIG. 4 is a perspective view of portable power system powering a first external device.

FIG. 4 is a perspective view of portable power system 400 powering a fry pan 412. As illustrated, system 400 includes housing 402 having battery receptacles 404a and 404b mounted on a top exterior surface. The battery receptacles 404a and 404b each securely connect to batteries 406a and 406b, respectively.

The system 400 includes an external cable 408 that is connected to device cable 410. The fry pan 412 can include one or more heating elements embedded therein having an electrical resistance. In some embodiments, the electrical resistance of the heating element can be approximately 0.8-2 ohms. In other embodiments, the electrical resistance can have a value that is varied based on input voltage and desired power output. System 400 can further include control circuitry embedded within housing 402 that can be configured to utilize the batteries' energy to deliver power to the heating element in fry pan 412. The power can be adjusted by utilizing a pulse-width-modulated output signal and adjusting its duty cycle and/or frequency. In some applications, the effective resistance of the heating element can change during operation and the system 400 can detect the change and adjust the output signal accordingly.

Figure 5:
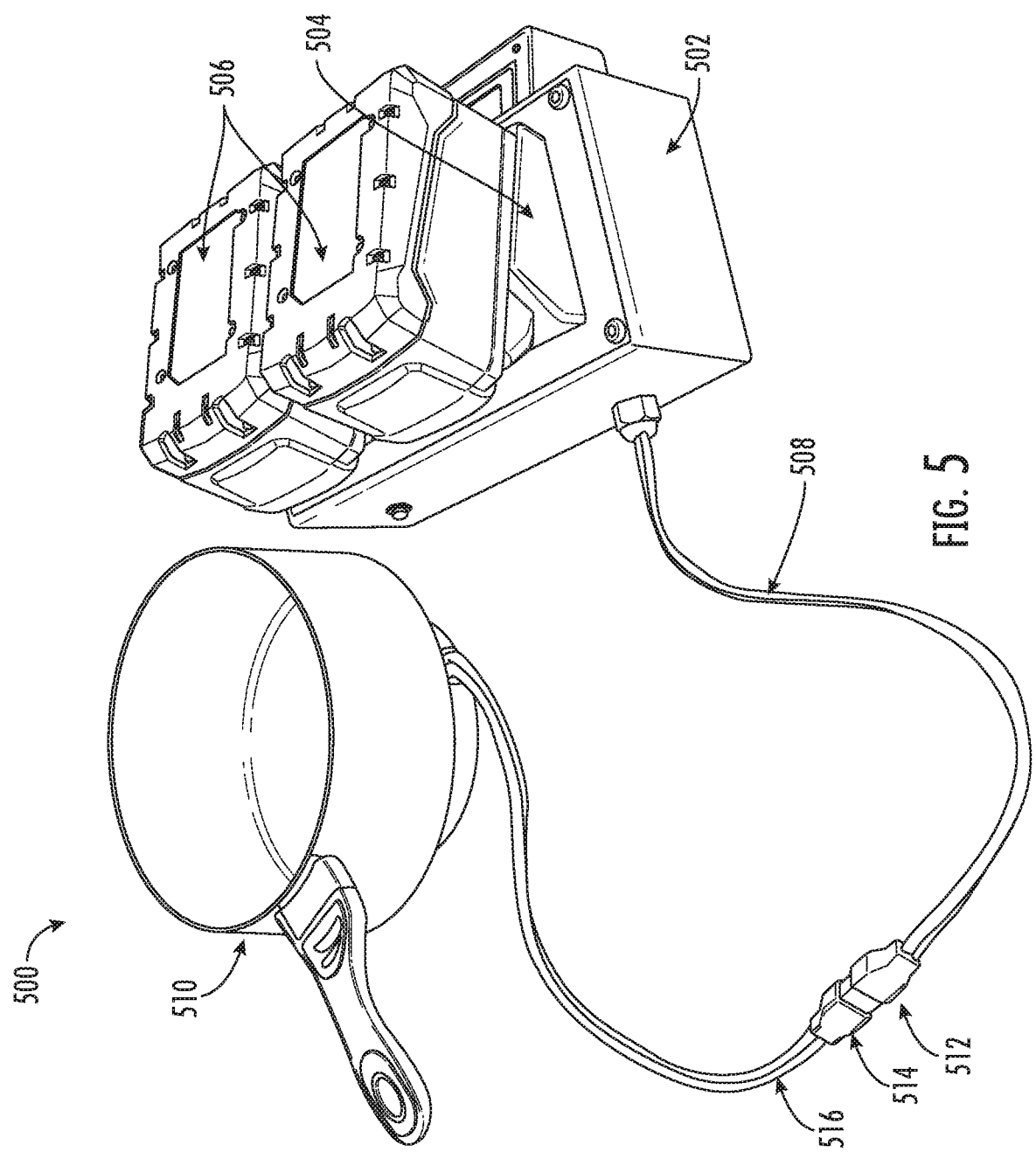
FIG. 5 is a perspective view of a portable power system powering a second external device.

FIG. 5 is a perspective view portable power system 500 powering a sauce pan 510. As illustrated, system 500 includes housing 502 having battery receptacles such as receptacle 504 mounted on a top exterior surface. The battery receptacles 504 can each securely connect to batteries 506.

The system 500 includes an external cable 508 that is connected to sauce pan 510 via a connector 512 that is configured to mate with a corresponding connector 514 on a cable 516 connected to sauce pan 510. Other embodiments may utilize different configurations for connecting to one or more external devices. For example, some embodiments may utilize an external cable 508 that includes a Y-type connector (not illustrated) that can be utilized to connect multiple devices simultaneously.

As discussed above with respect to the fry pan, the sauce pan 510 can also include one or more heating elements embedded therein having a certain resistance. The system 500 can be configured to utilize the batteries' 506 energy to deliver power to the heating element in sauce pan 510.

The above detailed description is intended to highlight various features and aspects of the invention by discussing specific attributes of particular embodiments of the invention. Persons of ordinary skill in the art will recognize that various changes can be made to the described embodiments without departing from the scope of the invention. All such modifications are intended to be within the scope and spirit of apparatuses, systems, and methods described herein.

As well, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Finally, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A portable power system comprising:
a housing;
a plurality of receptacles disposed on an external surface of the housing, each of the plurality of receptacles adapted to removably engage a battery to the housing, wherein at least one receptacle of the plurality of receptacles includes a first set of contacts retractable and expandable to engage mating contacts of a first battery type and a second set of contacts positioned at a different location than the first set of contacts and retractable and expandable to engage mating contacts of a second battery type;
a control circuit disposed within the housing and electrically coupled to at least one electrical contact positioned on each of the plurality of receptacles, the control circuit operable to provide output power to a detachable external device and wherein the control circuit is operable to adjust the output power in response to detecting a change in a battery parameter by multiplexing input power from the batteries and utilizing a one of the batteries having a higher charge for a longer period of time; and
a cord having a proximal end connected to an output of the control circuit and a distal end connected to the detachable external device, wherein the detachable external device comprises a DC-powered heating element that is coupled to a cooking device.

2. The portable power system of claim 1, wherein the cooking device is a fry pan.

3. The portable power system of claim 1, wherein the cooking device is a sauce pan.

4. The portable power system of claim 1, wherein the control circuit is operable to adjust the output power in response to identifying the detachable external device.

5. The portable power system of claim 1, wherein the control circuit is operable to select a series or parallel configuration for a plurality of batteries connected to the plurality of receptacles.

6. The portable power system of claim 5, wherein the series or the parallel configuration is selected in response to identifying the detachable external device.

7. The portable power system of claim 1, further comprising:
an AC electrical input port coupled to the housing, wherein the control circuit is operable to charge one or more batteries connected to the plurality of receptacles.

8. The portable power system of claim 1, wherein the control circuit is operable to detect a resistance associated with the detachable external device.

9. The portable power system of claim 8, wherein the control circuit sets the output power according to the resistance associated with the detachable external device.

10. The portable power system of claim 1, wherein the control circuit is operable to adjust the output power over a particular operating range in response to a user command input.

11. A portable power system comprising:
a housing;
a plurality of receptacles disposed on an external surface of the housing, each of the plurality of receptacles adapted to removably engage a battery to the housing, wherein at least one receptacle of the plurality of receptacles is configured to interchangeable receive a first removable insert having first set of contacts to engage mating contacts of a first battery type and a second removable insert having a second set of contacts positioned at a different location than the first set of contacts to engage mating contacts of a second battery type;
a control circuit disposed within the housing and electrically coupled to at least one electrical contact positioned on each of the plurality of receptacles, the control circuit operable to provide output power to a detachable external device and wherein the control circuit is operable to adjust the output power in response to detecting a change in a battery parameter by multiplexing input power from the batteries and utilizing a one of the batteries having a higher charge for a longer period of time; and
a cord having a proximal end connected to an output of the control circuit and a distal end connected to the detachable external device.

* * * * *